United States Patent [19]

Imazaike

[11] 4,127,041

[45] Nov. 28, 1978

[54] GEAR FOR PRECISION DEVICES

[76] Inventor: Mikiharu Imazaike, 22 Tanabe Nishino-cho, 8-chome, Higashi Sumiyoshi-ku, Osaka, Japan

[21] Appl. No.: 798,080

[22] Filed: May 18, 1977

[30] Foreign Application Priority Data

Feb. 2, 1977 [JP] Japan .................................. 52-10963

[51] Int. Cl.² ...................... F16H 57/00; F16H 1/14; F16H 55/14
[52] U.S. Cl. ...................................... 74/411; 74/417; 74/461
[58] Field of Search .................. 74/461, 411, 417, 443

[56] References Cited

U.S. PATENT DOCUMENTS

| | | | |
|---|---|---|---|
| 1,460,661 | 7/1923 | De Coninck | 74/461 |
| 3,173,301 | 3/1965 | Miller | 74/461 X |
| 3,304,795 | 2/1967 | Rouverol | 74/461 X |
| 3,636,792 | 1/1972 | Vigh | 74/461 |

FOREIGN PATENT DOCUMENTS 270,023 2/1914 Fed. Rep. of Germany ............. 74/461

*Primary Examiner*—Leonard H. Gerin
*Attorney, Agent, or Firm*—Burns, Doane, Swecker & Mathis

[57] ABSTRACT

A gear generally made of plastics for use in such precision devices as timepieces and the like and having improved gear teeth with reduced contacting noises is provided. Each tooth includes means for yielding an elastic deformation of the tooth so that, upon applications of fluctuated load thereto, the fluctuation of load will be cancelled by the elastic deformation of the tooth, whereby a remarkably quiet contacting movement with opposing gear can be achieved.

6 Claims, 12 Drawing Figures

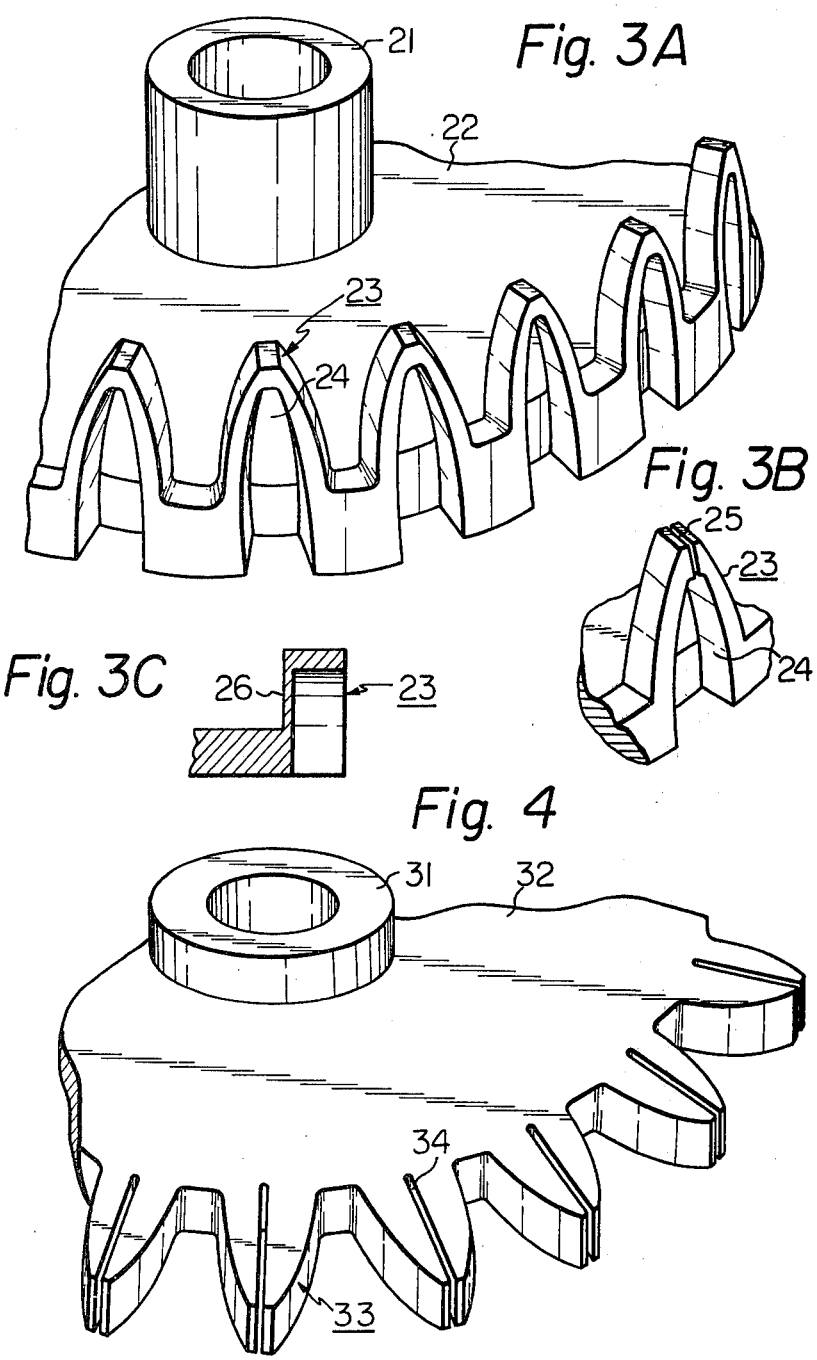

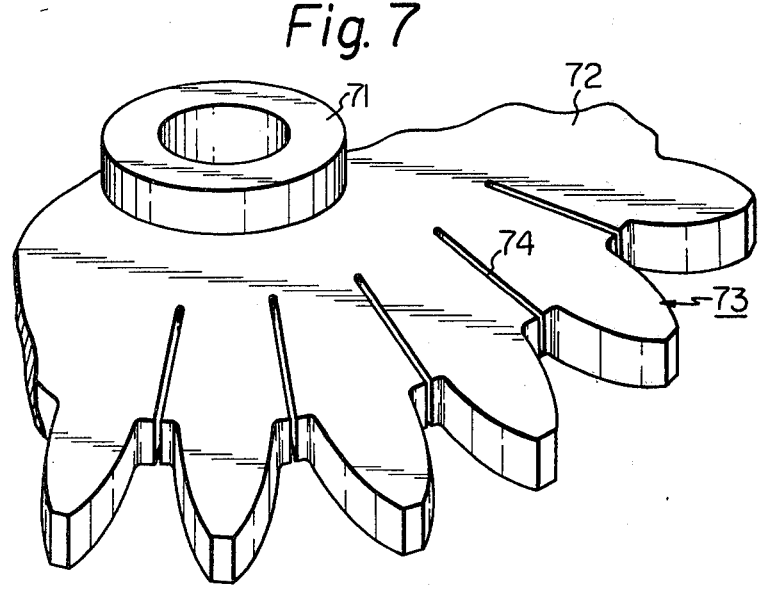
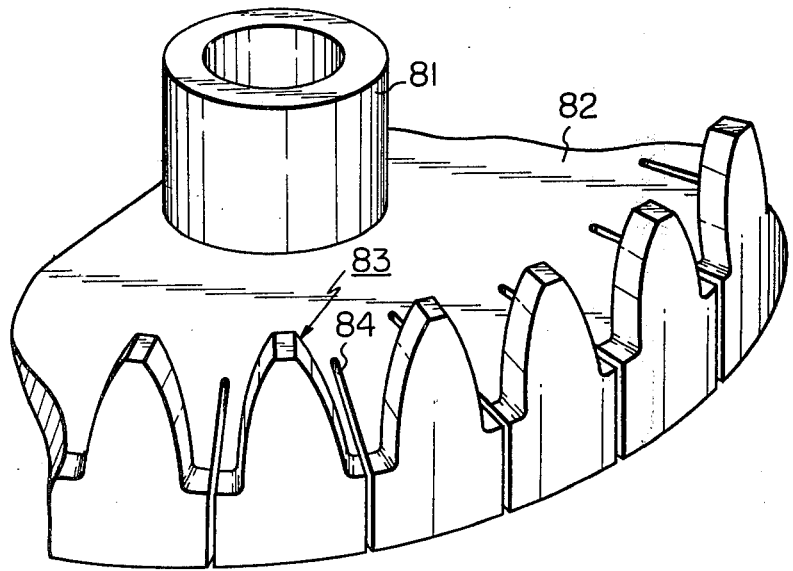

GEAR FOR PRECISION DEVICES

This invention relates to gears and, more particularly, to improvements in teeth of gears generally made of plastics for use in such precision devices as timepieces, acoustic devices and the like.

Such plastic gears have been fabricated heretofore by means of injection molding and, therefore, it has been unavoidable that such strains as eccentricities and the like have been caused to occur due to contractions at the time of the molding, whereby contacting noises have been unavoidably generated due to dimensional inaccuracy.

In mutual meshing of opposing gears, it is necessary that the respective components of velocity in the direction of the common normal on two opposing tooth surfaces at contacting portions of the meshing gears are always equal to each other in order that, deeming such gears respectively to be a rigid body, the two opposing surfaces keep contacting with each other while rotating at a predetermined angular velocity without mutually caving in or separating from each other. In other words, the gears are designed so that there will be no relative movement in the direction of the common normal between the two opposing surfaces during the moment of the contact but an existing relative movement consisting of a mutual sliding along a tangential plane at the contacting portions of the gears. Therefore, if the gears have an eccentricity, pitch error or the like, their opposing tooth surfaces do not contact with each other at their predetermined positions, whereby such problems as an interference of tooth, timing lag of contact and the like are caused to occur. When the contact timing lag occurs, the number of contacting sets of gear teeth is varied resulting in load fluctuations at the contacting portions when an interference of tooth occurs, similar load fluctuations are caused, extreme ones of which will result in unfavorable vibratory motions or noises. The present invention has been suggested to successfully remove such problems as described by providing a means that allows the gear teeth to perform an elastic deformation when they contact with those of an opposing gear, according to which, even when the interference of tooth occurs, tooth configuration deforms in response to any load increments at the contacting portion of each tooth so as to erase the interference. In the event of an occurrence of the variation in the number of contacting sets, the deformation acts also to erase such variation responsive to the fluctuations in the load at the contacting portions, thereby any extreme load fluctuations can be effectively eliminated and the contacting noises are prevented from being generated.

A primary object of the present invention is, therefore, to provide a gear that can effectively prevent noises from being generated when gear teeth contact with opposing gear teeth.

Another object of the present invention is to provide a gear which is easy to fabricate.

A further object of the present invention is to provide a gear which is suitable for use in small precision devices.

Other objects and advantages of the present invention shall become clear upon reading the following disclosures of the invention set forth in detail with reference to certain preferred embodiments thereof shown in accompanying drawings, in which:

FIG. 3A is a fragmentary perspective view showing another embodiment of the present invention;

FIG. 3B is a fragmentary perspective view showing a modification of the embodiment of FIG. 3A;

FIG. 3C is a fragmentary sectioned view of another modification of the embodiment of FIG. 3A; and FIGS. 4 through 8 show further various embodiments of the present invention respectively in the similar view to FIG. 1A or 3A.

Figure 1A:
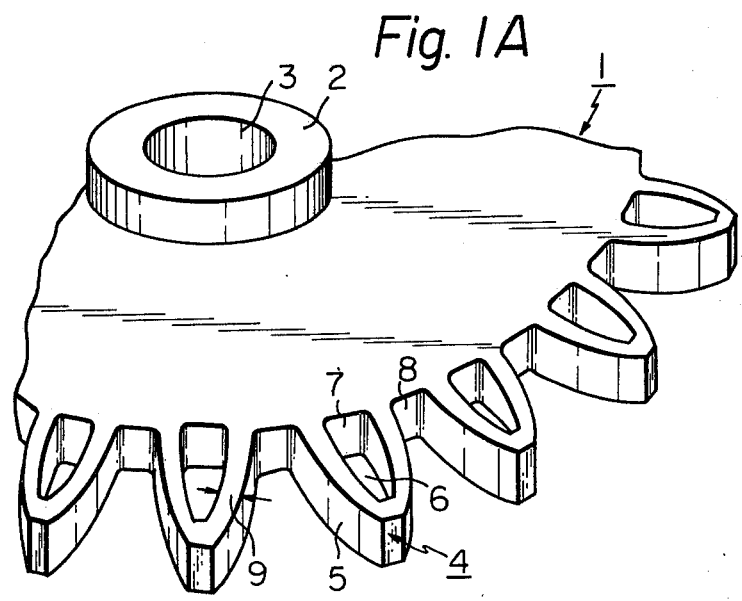
FIG. 1A is a fragmentary perspective view of a gear in an embodiment according to the present invention.

While the present invention shall now be referred to with reference to the preferred embodiments shown in the drawings, it should be understood that the intention is not to limit the invention only to those embodiments but to rather include all other possible modifications, alterations and equivalent arrangements within the scope of appended claims.

Referring now to FIG. 1 showing an embodiment in the case of spur gear, there is provided in the center of disk-shaped body 1 a boss 2 and an axial hole 3 is formed in the boss for inserting therein a pivoting shaft (not shown). On the peripheral edge of the body 1, a plurality of teeth 4 are formed at a predetermined pitch, of which outer surfaces 5 are made in well known tooth configuration. Inside the respective teeth 4, on the other hand, an aperture 6 is formed. Preferably, the shape of this aperture 6 is made to be substantially similar to the outer tooth configuration of the teeth 4 and bottom surface 7 of the respective apertures 6 is disposed substantially on the identical circumference to bottom edges 8 of the teeth 4. Thus, in the present embodiment, a thickness 9 of the respective teeth 4 defined by the outer surface 5 and aperture 6 similar to each other is uniform over all positions along the outer periphery of each tooth.

As fabricating material of this gear, preferably such plastic material as polyasetal, polyimide or the like is employed. As the apertures 6 are formed inside the teeth 4, in addition to mechanical characteristics of the plastic material employed, the teeth 4 are properly formed for providing an elastic deformation upon receiving an external force acting on the tooth surface, and the degree of this elastic deformation can be made variable by means of proper selections of the tooth configuration, tooth thickness or dimensions of the aperture, fabricating material employed and the like.

Figure 1C:
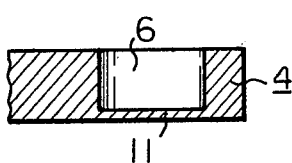
FIG. 1C is a fragmentary sectioned view showing a further modification of the embodiment of FIG. 1A.
Figure 1B:
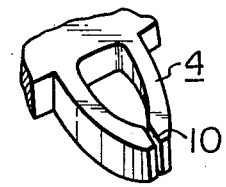
FIG. 1B is a fragmentary perspective view showing a modification of the embodiment shown in FIG. 1A.

As shown in FIG. 1B, it is possible to provide a slit 10 in the top part of each tooth 4 substantially in alignment with the center line thereof so that a larger elasticity or deformability will be provided as required. Further, the aperture 6 may be closed, as shown in FIG. 1C, by means of a film part 11 formed integral with the tooth 4 with the plastic material. In the illustrated case, the film with part 11 is provided on one side surface of the tooth 4 as an example, but the film may be provided in the middle position of the aperture 6 if desired. With this modification, the elasticity of the teeth 4 may be somewhat restrained by the film part 11 so that a controlled deformability will be attained.

Figure 2:
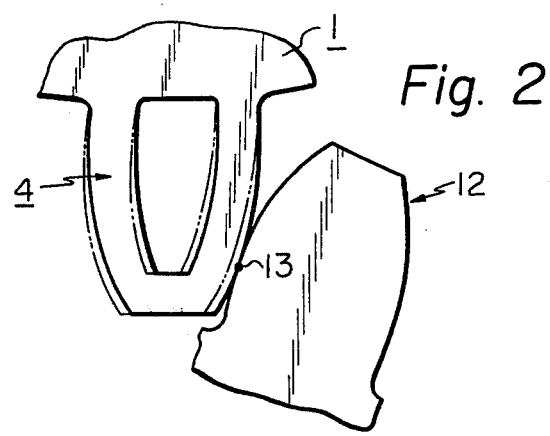
FIG. 2 is an explanatory view for contacting state of gear tooth in the embodiment of FIG. 1A with an opposing tooth of another gear.

Referring next to FIG. 2 showing a contacting state of the gear tooth 4 in the embodiment of FIG. 1A with an opposing tooth 12 of another gear, the gear teeth 4 and 12 contact with each other at a point 13 on their outer surfaces. When the force applied on the point 13 fluctuates due to a pitch fluctuation or the like of the teeth on either side of the gears, the tooth configuration of the tooth 4 having the aperture 6 will deform as shown by double-dotted chain lines depending on the amount of such force fluctuation, the deformation acting to erase the fluctuation. Due to this action, any extreme fluctuations in the load on the respective teeth is cancelled so that a remarkably quiet contacting movement can be achieved. It should be readily appreciated that the gear according to the present invention may be employed on either side of driving gear and driven gear and even on both sides of such opposing gears.

FIG. 3 shows another embodiment of the present invention in which the gear tooth configuration similar to that of FIG. 1 is employed in a crown gear. In the drawing, a disk-shaped body 22 is formed around an axial boss 21, having a plurality of gear teeth 23 respectively projecting out of the circumferential edge parallel to the axial direction of the boss 21 and body 22 which are provided at an equal pitch, having and an aperture 24 formed in each of the teeth 23. In the present instance, the shape of the aperture 24 is made to be similar to the outer surface configuration of the teeth 23 and the aperture 24 is opened on the side opposite to the teeth 23 as the most preferable structure, as in the case of the embodiment of FIG. 1A. It will be appreciated that, with this arrangement, the same operation and effects at those of the arrangement of FIG. 1A can be established.

As shown in FIG. 3B, the respective teeth 23 of the embodiment of FIG. 3A may be provided with a slit 25 at their top part so that the slit 25 will be in alignment with projecting axis to each tooth 23. Alternatively, the aperture 24 may be closed by a thin film part 26, as shown in FIG. 3C, preferably formed on the side facing the boss 21 of the respective teeth 23 and integrally therewith.

Referring next to a further embodiment of the invention shown in FIG. 4, a spur gear is formed by providing around an axial boss 31 a disk-shaped body 32, a plurality of gear teeth 33 on the outer circumferential surface so as to project radially therefrom, and a slit 34 in the respective teeth 33 substantially in the center thereof and in alignment with the radially projecting direction so that the respective teeth 33 will be divided into two halves along rotary direction of the gear and an elastic deformation will be easily yielded in the gear teeth. In the illustrated case, the length of the respective slits 34 is made to reach the bottom part of the respective teeth 33 but it should be appreciated that the length of the slit 34 may be freely varied so that a desired elasticity will be obtained since the elasticity of the respective teeth 33 upon applications of external forces to their contacting surface will vary depending on the length of the slit 34.

Figure 5:
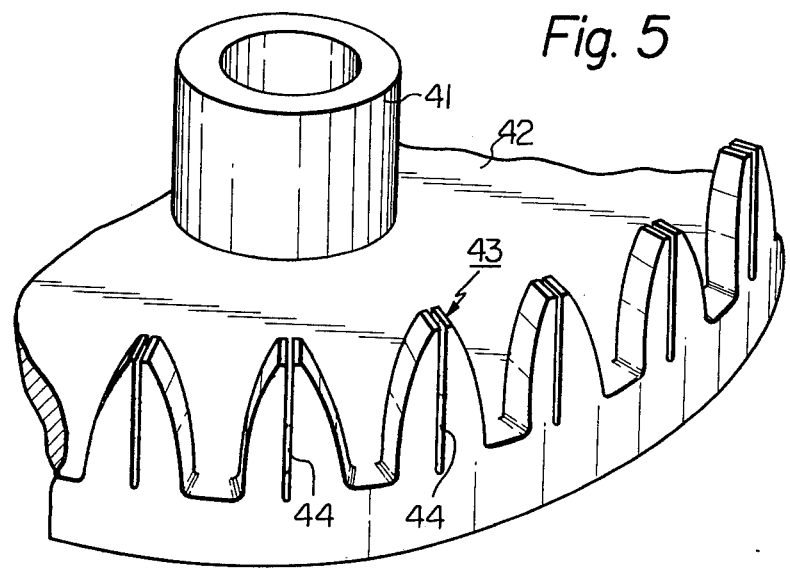

In FIG. 5, there is shown a further embodiment of the invention in which the arrangement of FIG. 4 is applied to the crown gear, wherein a disk-shaped body 42 is formed around an axial boss 41, a plurality of gear teeth 43 are provided on the circumferential edge so as to project vertically with respect to the plane of the body 42, that is, in parallel directions to the axial direction of the boss 41 and body 42, and a slit 44 is made in the respective teeth 43 from the top part to the bottom part thereof so as to divide each tooth into two halves along the rotary direction of the gear. The length of the slit 44 may be freely selected so that the elasticity of the teeth can be optimumly varied depending on requisites, as in the case of FIG. 4.

Figure 6:
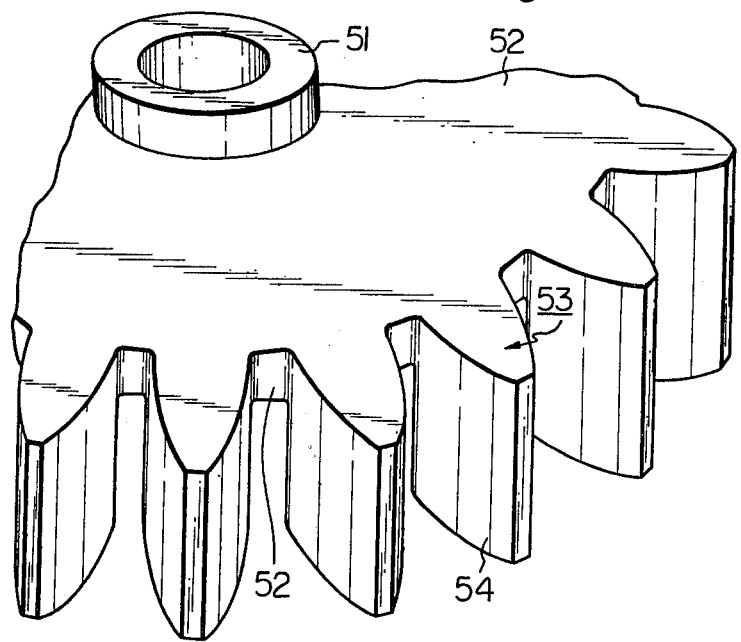

FIG. 6 shows a yet further embodiment of the present invention, in which a disk-shaped body 52 is formed around an axial boss 51 and a plurality of gear teeth 53 are provided at an equal pitch on the outer circumferential edge of the body 52 to project in radial directions. In this embodiment, in particular, the respective teeth 53 are provided with an extended part 54 extending in the direction of thickness of the body 52 with the same outer configuration as the teeth 53, so that this modified spur gear will engage an opposing gear mainly at the extended part 54 of the respective teeth 53. Therefore, when an external force is applied to the extended parts 54, the respective parts 54 are caused to be elastically deformed in the direction of the body thickness. The degree of such elastic deformation will be selectively determined to be of any desired value by properly selecting projecting amount of the extended part 54, its tooth configuration, fabricating material of the gear and the like.

With reference to FIG. 7, another embodiment of the present invention is referred to, in which a spur gear is formed by providing around an axial boss 71 a disk-shaped body 72 and a plurality of gear teeth 73 so as to extend radially from the circumferential edge of the body. In the present embodiment, radial slits 74 are made in the disk-shaped body 72 so that the respective teeth 73 will be divided by the slits 74 from each other substantially at the center of their bottom parts. With such provision of the slits 74, the respective teeth 73 are provided with an elasticity because of their long extending base parts defined by the respective slits 74. It will be understood that the degree of such elasticity will be dependent on the length and width of the slits 74 which may be selectively determined separately or jointly in accordance with required elasticity.

The embodiment of FIG. 7 can be also applied to the crown gear as shown in FIG. 8. In this case, a disk-shaped body 82 formed around an axial boss 81 is provided with a plurality of gear teeth 83 respectively projecting in parallel directions to the axial line of the axial boss 81, respective base parts of which teeth connected to the body 82 are divided by a plurality of slits 84 radially extending in the body to pass through substantially the center of the respective bottom or interconnecting bore parts of the teeth 83 between adjacent outer portions of the teeth. Dimensions of the respective slits 84 will be also properly selected to provide to the teeth a desired degree of the elastic deformability, as in the case of FIG. 7.

It will be appreciated that, while the present invention has been described only with reference to the illustrated embodiments, the respective types of the means for yielding the elastic deformation of the gear teeth may be properly used as selectively combined with one another in certain other manners such as, for example, combinations of the means of FIG. 4 with that of FIG. 6 or of those of FIG. 7 and FIG. 1, than that of FIG. 1B or 3B.

According to the present invention, as has been described in the foregoing, the gear teeth are provided with a means for yielding an elastic deformation of the teeth when they contact with opposing teeth of other gears so that, even in the case of gears involving dimensional inaccuracy to a certain extent, contacting noises of the gear teeth can be remarkably reduced. Therefore, the gear according to the present invention is remarkably advantageously utilized in the precision devices such as timepieces and the like in which the gear tooth contacting noises are an undesirable problem.

What is claimed is:

1. A gear for precision devices comprising:
   a boss including a hole defining an axis of rotation for the gear;
   a disk-shaped body mounted on the boss and extending therearound;
   a plurality of gear teeth disposed on the circumferential periphery of the body, the teeth extending from one side of the body in directions parallel with respect to the axis of rotation defined by the hole;
   wherein the gear teeth are respectively provided with means enabling the teeth to yield by elastically deforming at the time of contact with opposing gear teeth, the means comprising an aperture formed in each tooth and opened toward the other side of the disk-shaped body.

2. A gear according to claim 1 wherein the aperture is shaped similarly to the outer surface of the gear tooth configuration.

3. A gear according to claim 1 wherein the aperture is closed by a film part formed integrally with each of the teeth.

4. A gear according to claim 1 wherein the teeth are respectively provided with a slit formed at a top part of each tooth, the slit extending in an axial direction relative to the tooth.

5. A gear for precision devices comprising:
   a boss including a hole defining an axis of rotation for the gear;
   a disk-shaped body mounted on the boss and extending therearound;
   a plurality of gear teeth disposed on the circumferential periphery of the body, the teeth projecting radially from the circumferential periphery of the disk-shaped body;
   wherein the gear teeth are respectively provided with means enabling the teeth to yield by elastically deforming at the time of contact with opposing gear teeth; the means comprising an extended part of each of the teeth extending beyond one side of the body in directions parallel to the axis defined by the hole.

6. A gear for precision devices comprising:
   a boss including a hole defining an axis of rotation for the gear;
   a disk-shaped body mounted on the boss and extending therearound;
   a plurality of gear teeth disposed on the circumferential periphery of the body, the teeth including interconnecting base portions and outer portions extending in directions parallel with respect to the axis defined by the hole;
   wherein the gear teeth are respectively provided with means enabling the teeth to yield by elastically deforming at the time of contact with opposing gear teeth, the means comprising radial slits formed in the disk-shaped body, said slits passing centrally through the base portions between adjacent outer portions of the teeth.

* * * * *